(12) United States Patent
Lee

(10) Patent No.: US 8,970,970 B2
(45) Date of Patent: Mar. 3, 2015

(54) IMAGING LENS

(71) Applicant: LG Innotek Co., Ltd., Seoul (KR)

(72) Inventor: Kyung Hwan Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/062,429

(22) Filed: Oct. 24, 2013

(65) Prior Publication Data

US 2014/0118847 A1     May 1, 2014

(30) Foreign Application Priority Data

Oct. 25, 2012    (KR) ........................ 10-2012-0118795

(51) Int. Cl.
     *G02B 3/02*           (2006.01)
     *G02B 13/18*         (2006.01)
     *G02B 9/60*           (2006.01)

(52) U.S. Cl.
     USPC ........... 359/714; 359/739; 359/740; 359/763; 359/764

(58) Field of Classification Search
     USPC .......................... 359/714, 739, 740, 763, 764
     See application file for complete search history.

(56) References Cited

U.S. PATENT DOCUMENTS

2010/0253829 A1* 10/2010 Shinohara ..................... 359/714
2011/0249348 A1* 10/2011 Kubota et al. ................. 359/764

* cited by examiner

*Primary Examiner* — Evelyn A. Lester
(74) *Attorney, Agent, or Firm* — Saliwanchik, Lloyd & Eisenschenk

(57) ABSTRACT

An exemplary embodiment of the present invention relates to an imaging lens, the imaging lens including, in an ordered way from an object side, a first lens having positive (+) refractive power, a second lens having negative (−) refractive power, a third lens having positive (+) refractive power, a fourth lens having negative (−) refractive power, and a fifth lens having a negative (−) refractive power, wherein the third lens takes a meniscus shape convexly formed at an object side.

16 Claims, 8 Drawing Sheets

IMAGING LENS

This application claims the benefit under 35 U.S.C. §119 of Korean Patent Application No. 10-2012-0118795, filed Oct. 25, 2012, which is hereby incorporated by reference in its entirety.

BACKGROUND

1. Field of the Invention

The teachings in accordance with exemplary embodiments of this disclosure relate generally to an imaging lens.

2. Description of Related Art

Recently, vigorous research efforts are being made in the fields of a mobile phone-purpose camera module, a digital still camera (DSC), a camcorder, and a PC camera (an imaging device attached to a person computer), all connected with an image pick-up system. One of the most important components in order that a camera module related to such image pickup system obtains an image is a lens producing an image.

The mobile phones are being recently miniaturized and thinned in thickness thereof, and mounted with components for performing various functions.

As a result, the reality is that various researches and development are being waged to pursue miniaturization of an imaging lens of a camera module for mobile phones.

BRIEF SUMMARY

Exemplary embodiments of the present disclosure provide a bright lens optical system configured to realize miniaturization and high resolution.

In one general aspect of the present disclosure, there is provided an imaging lens, the imaging lens comprising: in an ordered way from an object side, a first lens having positive (+) refractive power;

a second lens having negative (−) refractive power;
a third lens having positive (+) refractive power;
a fourth lens having positive (+) refractive power: and
a fifth lens having negative (−) refractive power, wherein the third lens takes a meniscus shape convexly formed to an object side.

Preferably, but not necessarily, the first lens may take a meniscus shape convexly formed at both surfaces to an object side.

Preferably, but not necessarily, the second lens may take a concave shape.

Preferably, but not necessarily, the fourth lens may take a meniscus shape.

Preferably, but not necessarily, the first, second, third, fourth and fifth lenses may be aspherical at one surface or both surfaces.

Preferably, but not necessarily, one surface or all surfaces of the first, second, third, fourth and fifth lenses may be formed with one or more inflection points.

Preferably, but not necessarily, the imaging lens may meet a conditional expression of $1.0<\Sigma T/f<1.5$, where f is a focal length of an optical system, and $\Sigma T$ is a distance from an object side surface of the first lens to an image-forming surface.

Preferably, but not necessarily, the imaging lens may meet a conditional expression of $1.6<\Sigma N2\&N3<1.7$, where N2 and N3 are refractive indexes of the second and third lenses.

Preferably, but not necessarily, the imaging lens may meet a conditional expression of $1.5<N1\&N4\&N5<1.6$, where N1, N4 and N5 are refractive indexes of the first, fourth and fifth lenses.

Preferably, but not necessarily, the imaging lens may meet a conditional expression of $20<V2\&V3<30$, where Abbe' numbers of second and third lenses are V2 and V3.

Preferably, but not necessarily, the imaging lens may meet a conditional expression of $50<V1\&V4\&V5<60$, where Abbe' numbers of first, fourth and fifth lenses are V1, V4 and V5.

Preferably, but not necessarily, the imaging lens may meet a conditional expression of $3.6<\Sigma T<4.6$, where $\Sigma T$ is a distance from an object side surface of the first lens to an image-forming surface.

Preferably, but not necessarily, the imaging lens may meet a conditional expression of $2.0<F/\#<3.0$, where F-Number is F/#.

Preferably, but not necessarily, the imaging lens may meet a conditional expression of $R5\&R6>1$, where R5 and R6 are respectively a radius of curvature of first surface and second surface of the third lens.

Preferably, but not necessarily, the imaging lens may meet a conditional expression of $R5-R6<0$, where R5 and R6 are respectively a radius of curvature of first surface and second surface of the third lens.

Preferably, but not necessarily, the imaging lens may meet a conditional expression of $0.7<(R3+R4)/(R3-R4)<1.0$, where R3 and R4 are respectively a radius of curvature of first surface and second surface of the second lens.

Preferably, but not necessarily, the imaging lens may meet a conditional expression of $10.0<|(R5+R6)/(R5-R6)|<15.0$, where R5 and R6 are respectively a radius of curvature of first surface and second surface of the third lens.

In another general aspect of the present disclosure, there is provided an imaging lens, the imaging lens comprising: in an ordered way from an object side, a first lens having positive (+) refractive power;

a second lens having negative (−) refractive power;
a third lens having positive (+) refractive power;
a fourth lens having positive (+) refractive power: and
a fifth lens having negative (−) refractive power, wherein the fourth lens takes a meniscus shape, and wherein the imaging lens meets a conditional expression of $R5\&R6>1$, where R5 and R6 are respectively a radius of curvature of first surface and second surface of the third lens.

Preferably, but not necessarily, the third lens may take a meniscus shape convexly formed at an object side.

Preferably, but not necessarily, the first lens may be positioned at a front end of an object side surface with an aperture.

The exemplary embodiments of the present disclosure can realize a bright optical system with miniaturized compact construction and high resolution by being configured with 5 (five) pieces of lenses.

DETAILED DESCRIPTION

Exemplary embodiments of the present disclosure will be described in detail with reference to the accompanying drawings.

Figure 1:
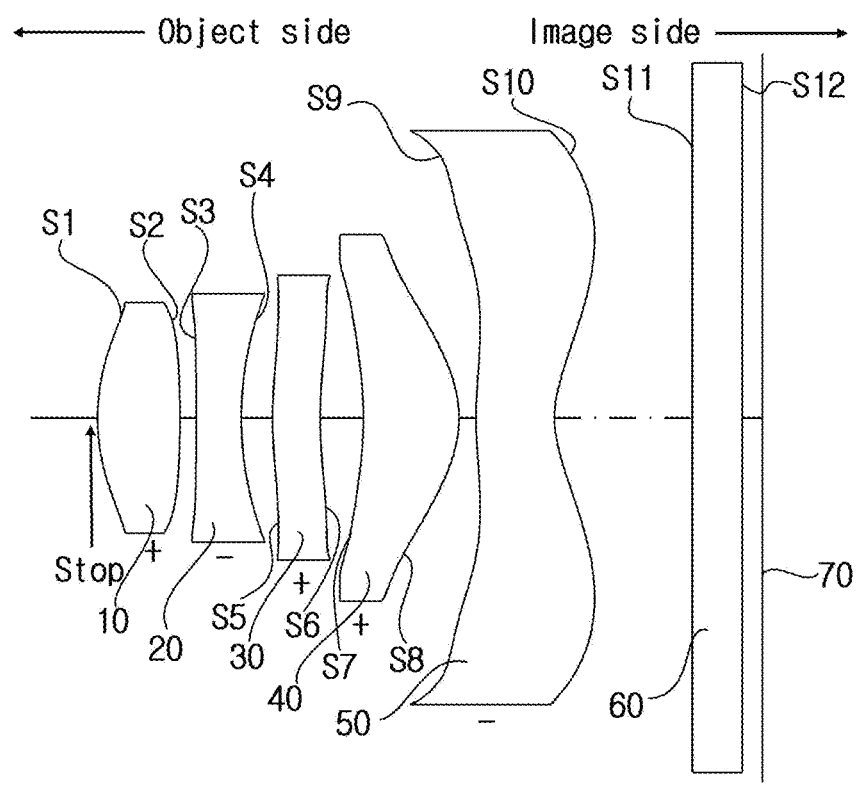
FIG. 1 is a constructional view illustrating a camera module lens according to an exemplary embodiment of the present disclosure.

FIG. 1 is a constructional view illustrating a camera module lens according to an exemplary embodiment of the present disclosure.

The camera module lens according to an exemplary embodiment of the present disclosure is arranged with an imaging lens comprised of a plurality of lenses with respect to an optical axis. In the constructional view of FIG. 1, relative thickness, size and shape of a lens may be exaggerated or reduced for clarity and explanations throughout, and spherical or aspherical shape may be proposed as an example, and therefore the shape is not limited thereto.

Referring to FIG. 1, the camera lens module may be arranged with, in an ordered way from an object side, an aperture, a first lens (10), a second lens (20), a third lens (30), a fourth lens (40), a fifth lens (50), a filter (60), a cover glass and a photo-detector (70).

Light corresponding to image information of a subject is incident on the photo-detector (70) by passing the first lens (10), the second lens (20), the third lens (30), the fourth lens (40), the filter (60) and the cover glass.

Hereinafter, in the description of the construction of each lens, an "object side surface" means a surface of a lens facing an object side with respect to an optical axis, and an "image side surface" means a surface of the lens facing a capturing surface with respect to the optical axis.

The first lens (10) may have a positive (+) refractive power, the second lens (20) may have a negative (−) refractive power, the third lens (30) may have a positive (+) refractive power, the fourth lens (40) may have a positive (+) refractive power, and the fifth lens (50) may have a negative (−) refractive power.

At this time, the first lens (10) may take a meniscus shape convexly formed at both surfaces to an object side, and the first lens (10) may be positioned at a front end of an object side surface with an aperture.

Furthermore, the second lens (20) may take a concave shape and the third lens (30) may take a meniscus shape convexly formed at both surfaces to an image side, and the fourth lens (40) may take a meniscus shape.

Furthermore, the first, second, third, fourth and fifth lenses (10, 20, 30, 40, 50) may be aspherical at both surfaces. In addition, one surface or all surfaces of the first, second, third, fourth and fifth lenses are formed with one or more inflection points. Hence, the exemplary embodiments of the present disclosure can realize a bright optical system with miniaturized compact construction and high resolution by being configured with 5 (five) pieces of lenses.

For information, 'S1 and 'S2' of FIG. 1 are respectively an object side surface and an image side surface of the first lens (10), 'S3' and 'S4' are respectively an object side surface and an image side surface of the second lens(20), 'S5' and 'S6' are respectively an object side surface and an image side surface of the third lens(30), 'S7' and 'S8' are respectively an object side surface and an image side surface of the fourth lens(40), 'S9' and 'S10' are respectively an object side surface and an image side surface of the fifth lens (50), and 'S11' and 'S12' are respectively an object side surface and an image side surface of the filter (60).

The filter (60) may be any one optical filter selected from an infrared filter and a cover glass. If the infrared filter is applied for the camera module, the infrared filter blocks infrared ray emitted from external light from being transferred to the photo-detector (70). Furthermore, the infrared filter transmits visible light, reflects infrared ray and outputs the reflected infrared ray to the outside.

The photo-detector (70) may be an image sensor including CCD (Charge Coupled Device) or CMOS (Complementary Metal Oxide Semiconductor), for example.

Because the later-described conditional expressions and exemplary embodiments are preferred embodiments enhancing an effect of interaction, it would be obvious to those skilled in the art that the present disclosure is not necessarily comprised of the following conditions. For example, only by satisfying some conditions of later-described conditional expressions, the lens construction (framework) of the present disclosure may have an enhanced effect of interaction.

$1.0 < \Sigma T/f < 1.5$ [Conditional expression 1]

$1.6 < N2 \& N3 < 1.7$ [Conditional expression 2]

$1.5 < N1 \& N4 \& N5 < 1.6$ [Conditional expression 3]

$20 < V2 \& V3 < 30$ [Conditional expression 4]

$50 < V1 \& V4 \& V5 < 60$ [Conditional expression 5]

$3.6 < \Sigma T < 4.6$ [Conditional expression 6]

$2.0 < F/\# < 3.0$ [Conditional expression 7]

$R5 \& R6 > 1$ [Conditional expression 8]

$R5 - R6 < 0$ [Conditional expression 9]

$0.7 < (R3+R4)/(R3-R4) < 1.0$ [Conditional expression 10]

$10.0 < |(R5+R6)/(R5-R6)| < 15.0$, [Conditional expression 11]

where, f: a focal length of an optical system f1,f2,f3,f4,f5: focal lengths of first, second, third, fourth and fifth lenses ΣT: a distance from an object side surface of the first lens to an image-forming surface.

N1,N2,N3,N4,N5: refractive indexes of the first, second, third, fourth and fifth lenses V1,V2,V3,V4,V5: Abbe's numbers of the first, second, third, fourth and fifth lenses F/#:F-Number R3: radius of curvature of first surface of the second lens R4: radius of curvature of second surface of the second lens R5: radius of curvature of first surface of the third lens R6: radius of curvature of second surface of the third lens Hereinafter, the action and effect of the present disclosure will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes $10^1$, and E−02 denotes $10^{-2}$.

$$z = \frac{cY^2}{1+\sqrt{1-(1+K)c^2Y^2}} + AY^4 + BY^4 + CY^4 + DY^4 + EY^4 + FY^4 + \ldots \quad \text{[Equation 1]}$$

where, z: a distance from the lens's top-point to an optical axis direction, c: basic curvature of a lens, Y: a distance towards a direction perpendicular to an optical axis, K: Conic constant, and A, B, C, D, E, F: aspheric coefficients Exemplary Embodiments The following Table 1 shows an exemplary embodiment matching the aforementioned conditional expressions.

TABLE 1

| Exemplary embodiment | | Exemplary embodiment | |
|---|---|---|---|
| F | 3.13 | N1 | 1.53 |
| F1 | 2.37 | V1 | 56.5 |
| F2 | −3.34 | N2 | 1.65 |
| F3 | 23.84 | V2 | 23.0 |
| f4 | 2.13 | N3 | 1.65 |
| f5 | −2.25 | V3 | 23.0 |
| ΣT | 4.00 | N4 | 1.53 |
| | | V4 | 56.5 |
| | | N5 | 1.53 |
| | | V5 | 56.5 |

Referring to Table 1, it can be noted that N2 and N3 are 1.65 that matches the conditional expression 2, and V2 and V3 are 23 that matches the conditional expression 4.

The following Table 2 shows an exemplary embodiment which is a more detailed exemplary embodiment over that of Table 1.

TABLE 2

| Surface number | Radius of curvature (R) | Thickness or distance (d) | Refractive index (N) | materials |
|---|---|---|---|---|
| STOP* | 1.50 | 0.50 | 1.53 | Plastic |
| 2* | −6.92 | 0.10 | | |
| 3* | −18.37 | 0.27 | 1.65 | Plastic |
| 4* | 2.46 | 0.19 | | |
| 5* | 2.94 | 0.29 | 1.65 | Plastic |
| 6* | 3.49 | 0.26 | | |
| 7* | −2.46 | 0.57 | 1.53 | Plastic |
| 8* | −0.84 | 0.10 | | |
| 9* | 2.88 | 0.47 | 1.53 | Plastic |
| 10 | 0.80 | 0.83 | | |
| 11 | INFINITY | 0.30 | 1.53 | IR-filter |
| 12 | INFINITY | 0.12 | | |
| | | 0.22 | | |
| image | INFINITY | 0.00 | | |
| | | 0.00 | | |

The notation * in the above Table 2 and following Table 3, which is further written near the surface number indicates aspheric. The following Table 3 shows a value of aspheric coefficient of each lens in the exemplary embodiment of Table 2.

TABLE 3

| Surface number | k | A | B | C | D | E |
|---|---|---|---|---|---|---|
| 1* | −0.4602 | −0.0192 | 0.0339 | −0.4302 | 0.7779 | 1.0008 |
| 2* | 44.8693 | 0.0075 | −0.0545 | −0.7402 | 0.9667 | 0.4718 |
| 3* | 482.9808 | 0.0641 | 0.0479 | −0.9548 | 1.1833 | 0.0668 |
| 4* | −29.0347 | 0.1811 | −0.0218 | −0.3132 | 0.3122 | 0.0363 |
| 5* | 0.0000 | −0.2772 | 0.1203 | 0.0707 | −0.0516 | 0.0112 |
| 6* | 0.0000 | −0.1140 | −0.1400 | 0.2783 | −0.3014 | .2261 |
| 7* | 1.4856 | 0.2275 | −0.1719 | 0.0342 | −0.0661 | .0697 |
| 8* | −0.7762 | 0.3883 | −0.2344 | 0.1036 | 0.0475 | 0.0358 |
| 9* | −102.0643 | −0.0896 | −0.0495 | 0.0616 | −0.0178 | .0015 |
| 10* | −6.2540 | −0.1147 | 0.0463 | −0.0161 | 0.0031 | 0.0002 |

Figure 2A:
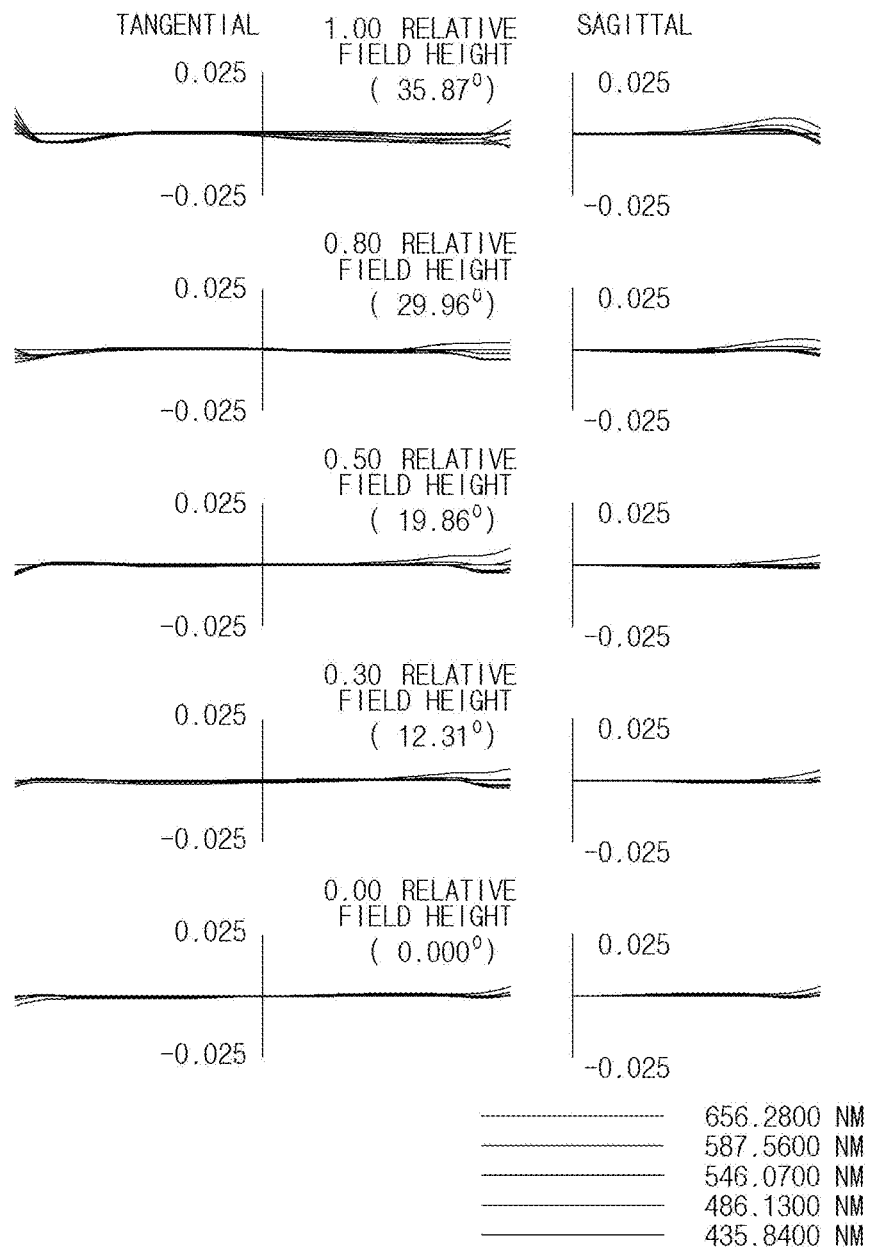
FIGS. 2a and 2b are graphs measuring coma aberrations according to an exemplary embodiment of the present disclosure.
Figure 2B:
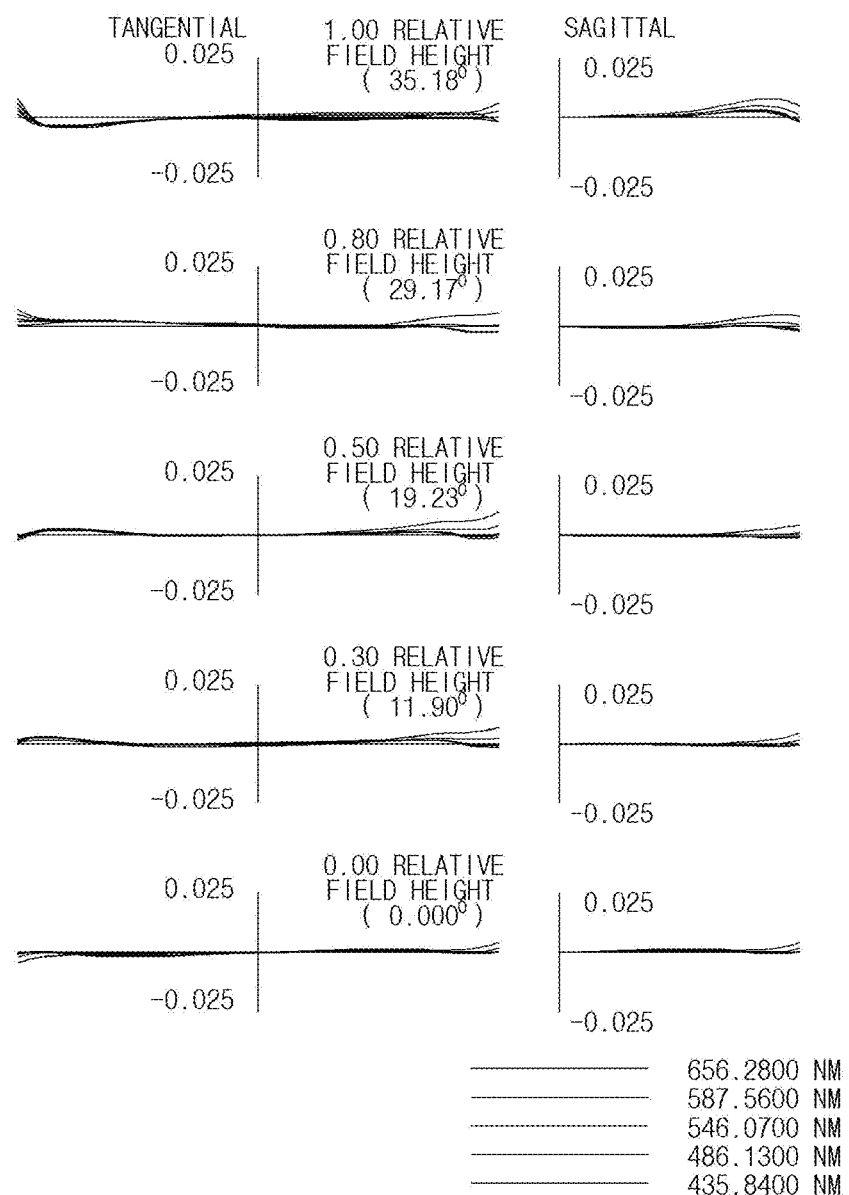

FIGS. 2a and 2b are graphs measuring coma aberrations according to an exemplary embodiment of the present disclosure, where tangential aberration and sagittal aberration of each wavelength based on a field height are measured. In FIG. 2, it is interpreted that a coma aberration correcting function is good as curves approach the X axis from a positive axis and a negative axis. In the measurement exemplary embodiments of FIG. 2, because values of images in nearly all fields proximate to the X axis, coma aberration correction function demonstrates a superior figure.

Figure 3:
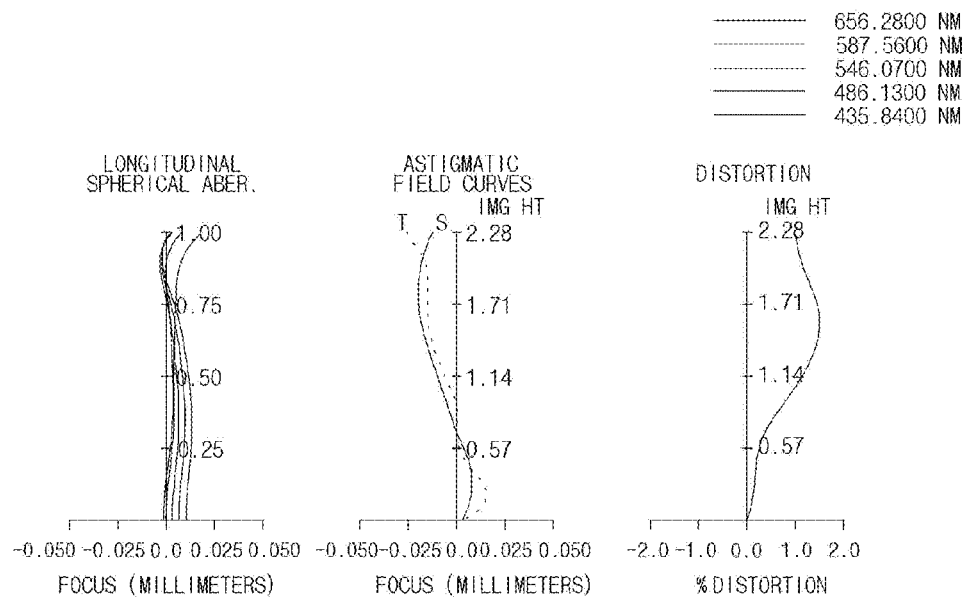
FIGS. 3 and 4 are graphs illustrating an aberration according to an exemplary embodiment of the present disclosure, where longitudinal spherical aberration, astigmatic field curves and distortion are measured, in order from left side.
Figure 4:
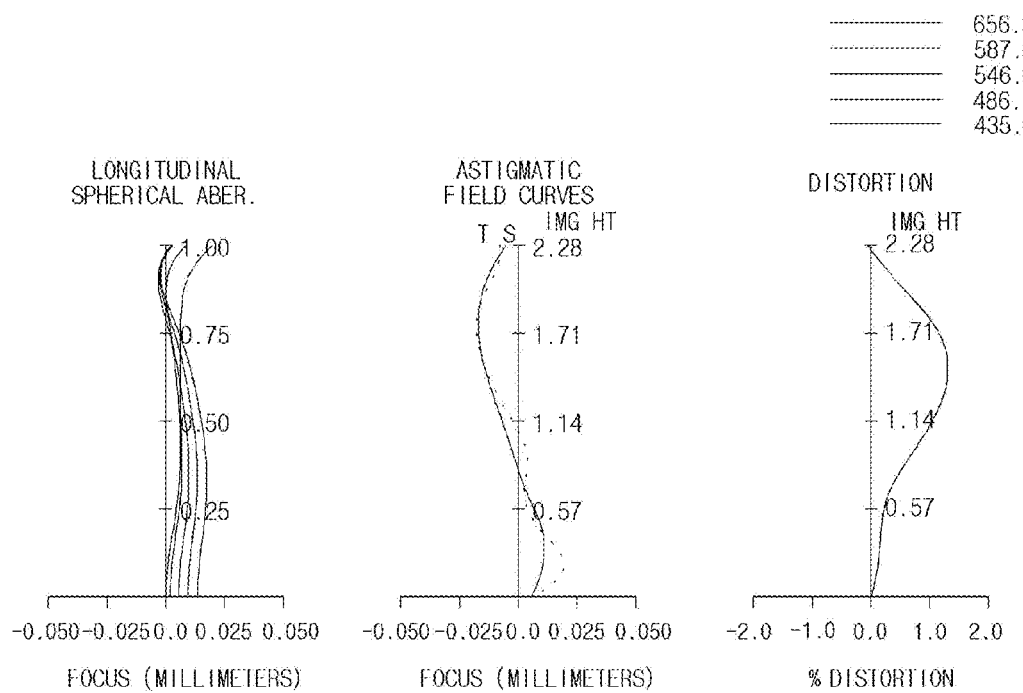

FIGS. 3 and 4 are graphs illustrating an aberration according to an exemplary embodiment of the present disclosure, where longitudinal spherical aberration, astigmatic field curves and distortion are measured, in order from left side.

In FIGS. 3 and 4, a Y axis means size of an image, and an X axis means focal length (unit: mm) and distortion degree (unit: %). In FIG. 3, it is interpreted that an aberration correcting function is good as curves approach the Y axis. In the shown aberration diagram, because values of images in nearly all fields appear proximate to the Y axis, spherical aberration, astigmatic aberration and distortion aberration all demonstrate a superior figure.

First, FIG. 3 illustrates a graph illustrating an aberration at an infinity location, where a range of the longitudinal spherical aberration is −0.008 mm~+0.012 mm, a range of astigmatic aberration is −0.021 mm~+0.016 mm, and a range of distortion aberration is 0 mm~+1.5 mm.

FIG. 4 illustrates a graph illustrating an aberration at 10 cm location, where a range of the longitudinal spherical aberration is −0.006 mm~+0.017 mm, a range of astigmatic aberration is −0.022 mm~+0.020 mm, and a range of distortion aberration is 0 mm~+1.4 mm, such that the imaging lens according to the exemplary embodiments of the present disclosure can correct the characteristics of spherical aberration, astigmatic aberration and distortion aberration, whereby the imaging lens according to the exemplary embodiment of the present invention has an excellent lens characteristics.

Figure 5A:
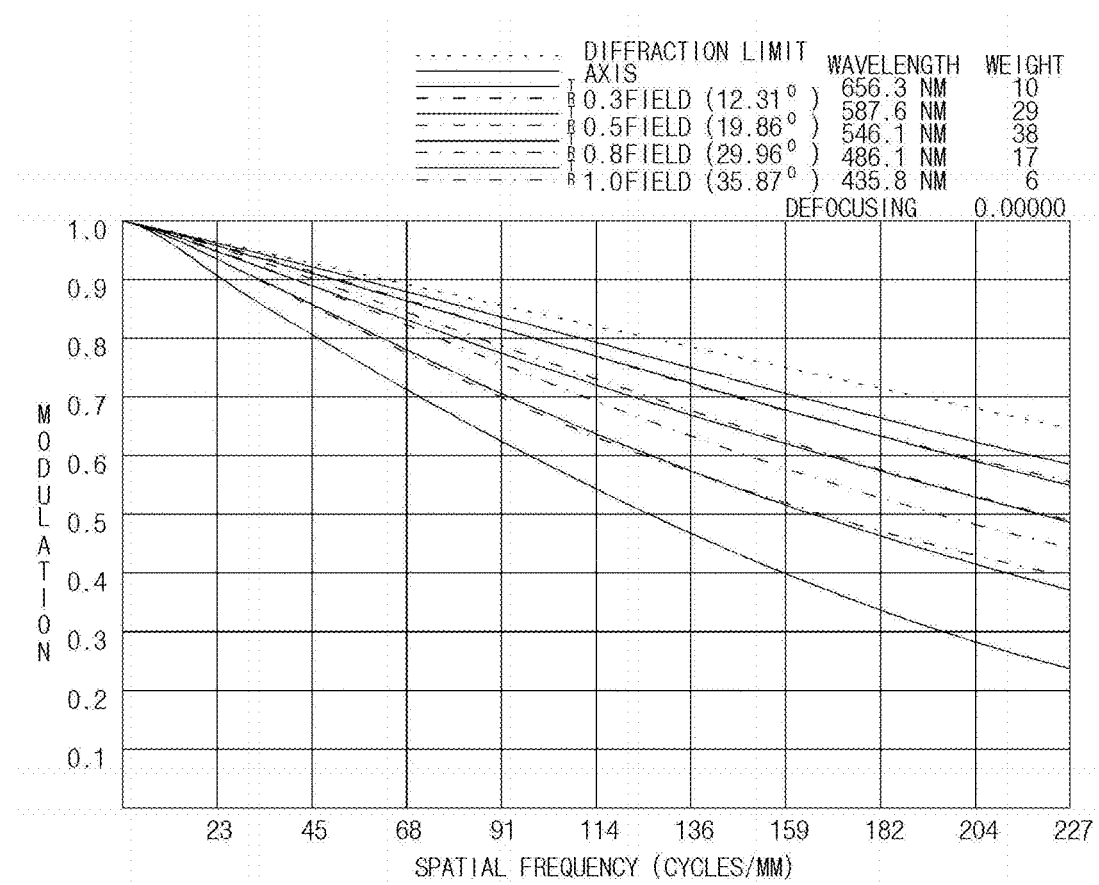
FIGS. 5a and 5b are graphs illustrating MTF (Modulation Transfer Function) characteristics relative to spatial frequency at a lens position according to an exemplary embodiment of the present disclosure.
Figure 5B:
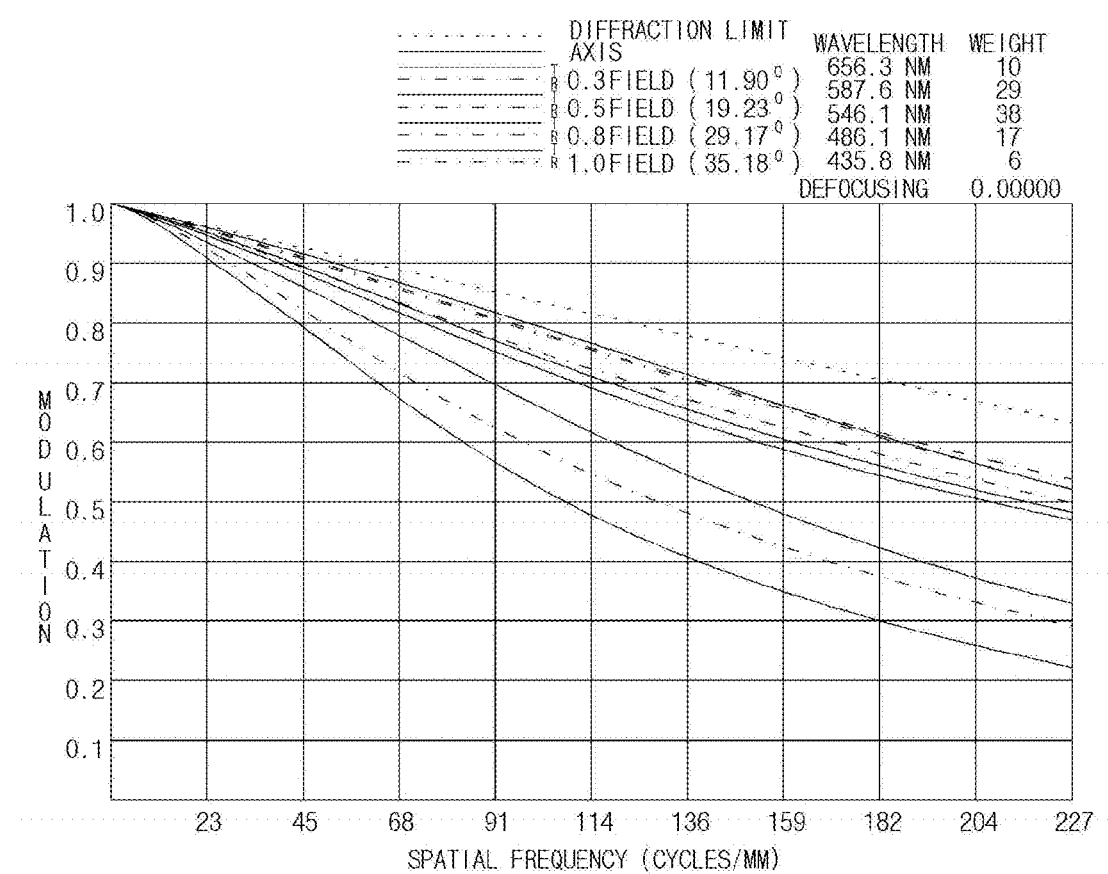

FIGS. 5a and 5b are graphs illustrating MTF (Modulation Transfer Function) characteristics relative to spatial frequency at a lens position according to an exemplary embodiment of the present disclosure, where the MTF characteristics depending on changes in spatial frequency (cycle/mm) were measured. At this time, the MTF characteristics are ratio values that have calculated a difference of images captured after light having started from a surface of an original object passes through a lens, where if an MTF value is '1', it is the most ideal, and the MTF value decreases, the resolution deteriorates.

Because all MTF values are measured high, in a case where a lens position is infinity as in FIG. 5a, and in a case where a lens position is 10 cm as in FIG. 5b, the imaging lens according to the exemplary embodiment of the present invention has an excellent optical characteristics.

Figure 6A:
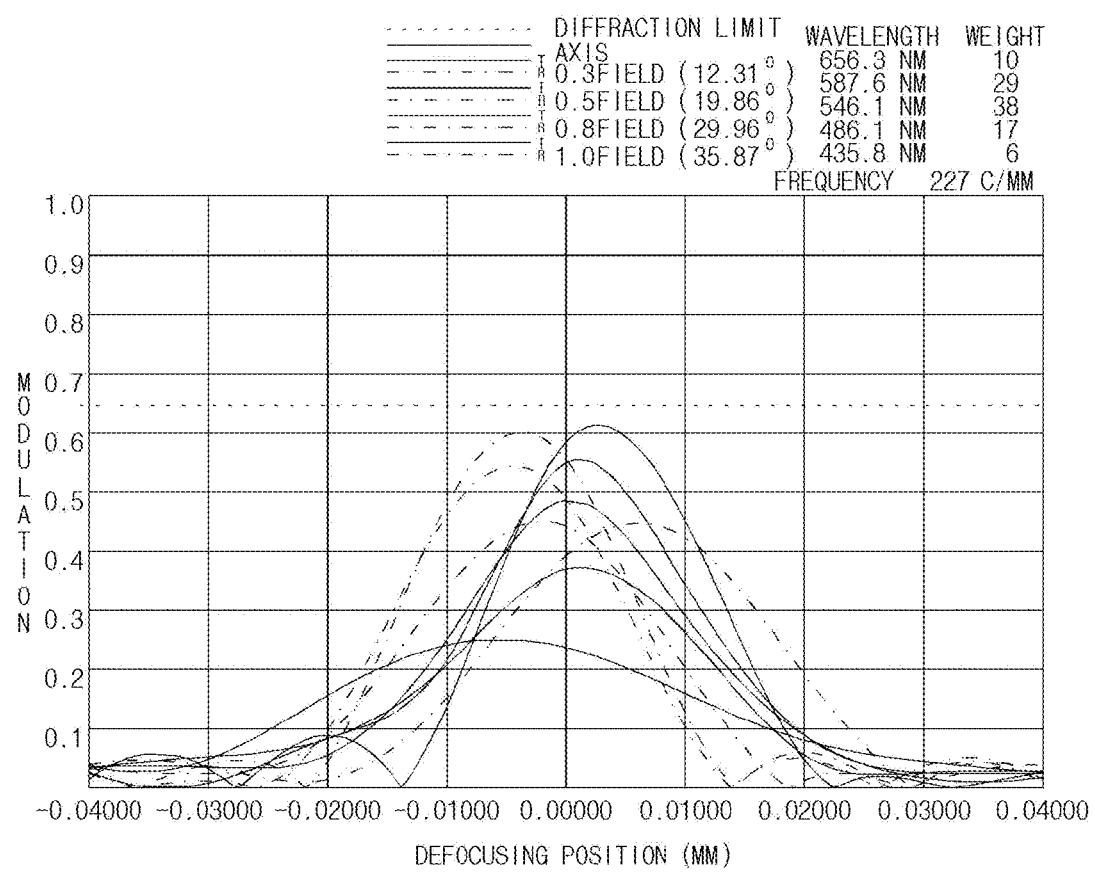
FIGS. 6a and 6b are graphs illustrating characteristics of diffraction MTF (Modulation Transfer Function) at a lens position according to an exemplary embodiment of the present disclosure.
Figure 6B:
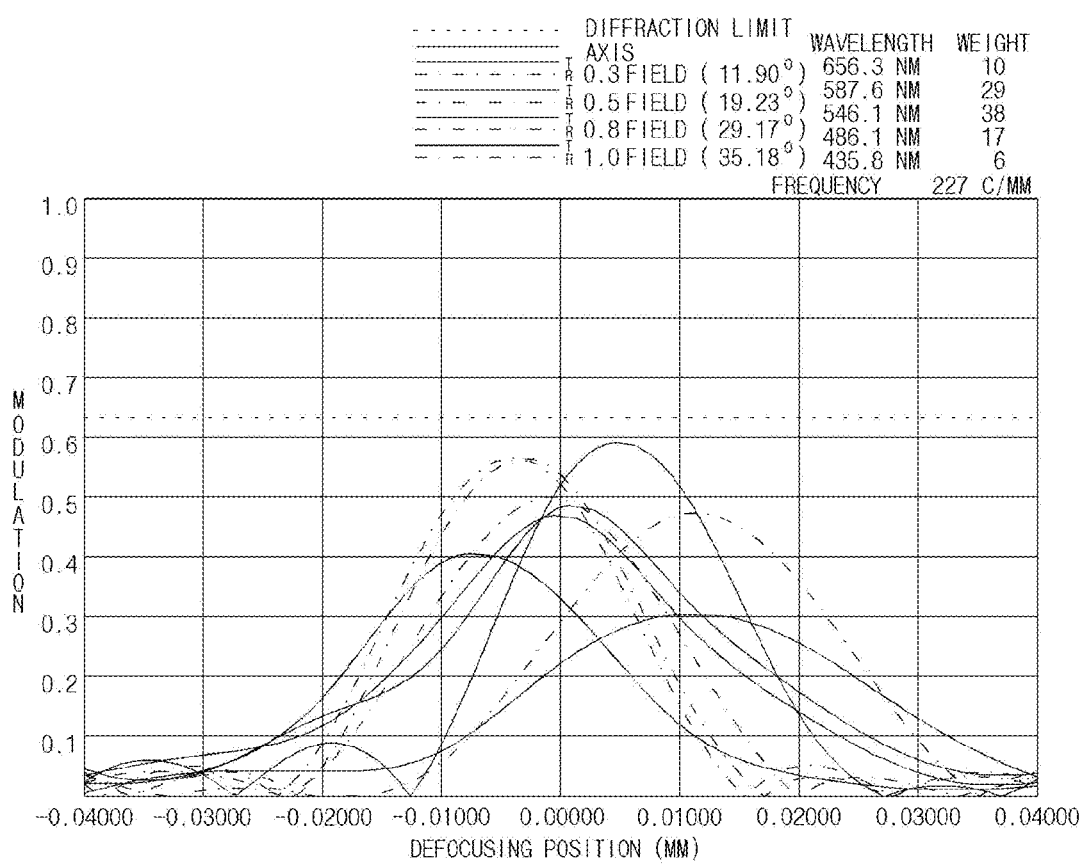

FIGS. 6a and 6b are graphs illustrating characteristics of diffraction MTF (Modulation Transfer Function) at a lens position according to an exemplary embodiment of the present disclosure, where FIG. 6a is a graph illustrating a lens position at infinity, and FIG. 6b is a graph illustrating a lens position of 10 cm. Thus, the frequency is 227 c/mm, which is a through-focus MTF.

The previous description of the present disclosure is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

What is claimed is:

1. An imaging lens, the imaging lens comprising:
   in an ordered way from an object side, a first lens having positive (+) refractive power;
   a second lens having negative (−) refractive power;
   a third lens having positive (+) refractive power;
   a fourth lens having positive (+) refractive power: and
   a fifth lens having negative (−) refractive power, wherein the third lens takes a meniscus shape convexly formed to an object side; and
   wherein the imaging lens meets a conditional expression of 20<V2 & V3<30, where Abbe' numbers of the second and third lenses are V2 and V3, respectively.

2. The imaging lens of claim 1, wherein the first lens takes a meniscus shape convexly formed at both surfaces to an object side.

3. The imaging lens of claim 1, wherein the second lens takes a concave shape.

4. The imaging lens of claim 1, wherein the fourth lens takes a meniscus shape.

5. The imaging lens of claim 1, wherein the first, second, third, fourth and fifth lenses are aspherical at one surface or both surfaces.

6. The imaging lens of claim 1, wherein one surface or all surfaces of the first, second, third, fourth and fifth lenses are formed with one or more inflection points.

7. The imaging lens of claim 1, wherein the imaging lens meets a conditional expression of $1.0<\Sigma T/f<1.5$, where f is a focal length of an optical system, and $\Sigma T$ is a distance from an object side surface of the first lens to an image-forming surface.

8. The imaging lens of claim 1, wherein the imaging lens meets a conditional expression of 1.6<N2 & N3<1.7, where N2 and N3 are refractive indexes of the second and third lenses.

9. The imaging lens of claim 1, wherein the imaging lens meets a conditional expression of 1.5<N1 & N4 & N5<1.6, where N1, N4 and N5 are refractive indexes of the first, fourth and fifth lenses.

10. The imaging lens of claim 1, wherein the imaging lens meets a conditional expression of 50<V1 & V4 & V5<60, where Abbe' numbers of first, fourth and fifth lenses are V1, V4 and V5.

11. The imaging lens of claim 1, wherein the imaging lens meets a conditional expression of 2.0<F/#<3.0, where F-Number is F/#.

12. The imaging lens of claim 1, wherein the imaging lens meets a conditional expression of R5 & R6>1, where R5 and R6 are respectively a radius of curvature of first surface and second surface of the third lens.

13. The imaging lens of claim 1, wherein the imaging lens meets a conditional expression of R5−R6<0, where R5 and R6 are respectively a radius of curvature of first surface and second surface of the third lens.

14. An imaging lens, the imaging lens comprising:
   in an ordered ova from an object side, a first lens having positive (+)refractive power;
   a second lens having negative (−) refractive power;
   a third lens having positive (+) refractive power:
   a fourth lens having positive (+) refractive power; and
   a fifth lens having negative (−) refractive power, wherein the third lens takes a meniscus shape convexly formed to an object side; and
   wherein the imaging lens meets a conditional expression of $3.6<\Sigma T<4.6$, where $\Sigma T$ is a distance from an object side surface of the first lens to an image-forming surface.

15. An imaging lens comprising:
   in an ordered way from an object side, a first lens having positive (+) refractive power;
   a second lens having negative (−) refractive power;
   a third lens having positive (+) refractive power;
   a fourth lens having positive (+) refractive power; and
   a fifth lens having negative (−) refractive power, wherein the third lens takes a meniscus shape convexly formed to an object side; and
   wherein the imaging lens meets a conditional expression of 0.7<(R3+R4)/(R3−R4)<1.0, where R3 and R4 are respectively a radius of curvature of first surface and second surface of the second lens.

16. An imaging lens comprising:
   in an ordered way from an object side, a first lens having positive (+) refractive power;
   a second lens having negative (−) refractive power;
   a third lens having positive (+) refractive power;
   a fourth lens having positive (+) refractive power; and
   a fifth lens having negative (−) refractive power, wherein the third lens takes a meniscus shape convexly formed to an object side; and
   wherein the imaging lens meets a conditional expression of 10.0<|(R5+R6)/(R5−R6)|<15.0, where R5 and R6 are respectively a radius of curvature of first surface and second surface of the third lens.

* * * * *